United States Patent [19]

Miyaka et al.

[11] 4,326,046
[45] Apr. 20, 1982

[54] PROCESS FOR PRODUCING MODIFIED POLYTETRAFLUOROETHYLENE

[75] Inventors: Haruhisa Miyaka, Yokohama; Masami Yamashita, Yokosuka; Tatsurō Asawa, Yokohama, all of Japan

[73] Assignee: Asahi Glass Company, Ltd., Tokyo, Japan

[21] Appl. No.: 203,505

[22] Filed: Nov. 3, 1980

[30] Foreign Application Priority Data

Nov. 30, 1979 [JP] Japan .................. 54-154222

[51] Int. Cl.³ .......................... C08F 259/08
[52] U.S. Cl. .................. 525/276; 525/902; 204/159.17
[58] Field of Search .................. 525/276, 902

[56] References Cited

U.S. PATENT DOCUMENTS 3,666,693  5/1972  Chapiro et al. ............ 525/276
4,036,802  7/1977  Poirier .................. 260/29.6 RB
4,129,618 12/1978  Downer et al. ............ 525/276
4,132,682  1/1979  Seita et al. .............. 521/27

FOREIGN PATENT DOCUMENTS 11853  6/1980  European Pat. Off. .

OTHER PUBLICATIONS

Chemical Abstracts, vol. 83, No. 8 (8/25/75), p. 87; Abstract 60436v.
Chemical Abstracts, vol. 83, No. 10 (9/8/75), p. 5; Abstract 80303c.

Primary Examiner—Carman J. Seccuro
Attorney, Agent, or Firm—Oblon, Fisher, Spivak, McClelland & Maier

[57] ABSTRACT

A modified polytetrafluoroethylene is produced by polymerizing tetrafluoroethylene in an aqueous medium containing a dispersing agent with a polymerization initiator source and then, copolymerizing tetrafluoroethylene and a fluorinated monomer having an acid type functional group as a copolymerizable modifier in the presence of the resulting polytetrafluoroethylene to obtain a modified polytetrafluoroethylene having the modifier component of 0.001 to 10 mol %.

4 Claims, No Drawings

PROCESS FOR PRODUCING MODIFIED POLYTETRAFLUOROETHYLENE

BACKGROUND OF THE INVENTION

1. Field of the Invention

The present invention relates to a process for producing a modified polytetrafluoroethylene. More particularly, it relates to a process for producing a modified polytetrafluoroethylene having a homopolymer of tetrafluoroethylene as a core and a copolymer having functional groups as a sheath layer of particles of the polymer by homopolymerizing tetrafluoroethylene in the first step and then, copolymerizing tetrafluoroethylene and a fluorinated monomer having a specific functional group in the later step in an emulsion polymerization of tetrafluoroethylene.

2. Description of the Prior Arts

Polytetrafluoroethylene obtained by an emulsion polymerization of tetrafluoroethylene (referring to as fine powder) is easily fibrilated by shear force. Various applications of the products of polytetrafluoroethylene obtained by fibrilation have been proposed, for example, a dust-preventing method using fibrilated polytetrafluoroethylene as disclosed in Japanese Unexamined Patent Publication No. 38684/1972 and No. 107992/1974; a strength improving method for rubber etc. disclosed in Japanese Unexamined Patent Publication No. 85845/1978, No. 8650/1978; and No. 43853/1977 etc.; and a process for preparing porous sheet disclosed in Japanese Patent Publication No. 28030/1974 and Japanese Unexamined Patent Publication No. 7284/1971; and others.

In the production of an ion exchange membrane for improving chemical resistance, it has been proposed to utilize a net made of fibrile of polytetrafluoroethylene as disclosed in Japanese Unexamined Patent Publication No. 46589/1976. An incorporation of a relatively small amount of fibrile of polytetrafluoroethylene for improving tear strength and flexural strength of a cation exchange membrane of a fluorinated resin as a membrane for an electrolysis to obtain a base as disclosed in Japanese Unexamined Patent Publication No. 149881/1978, No. 1283/1979 and No. 107479/1979.

The inventors have found the following interest facts in the studies for reinforcing a cation exchange membrane of a fluorinated resin by blending fibriles of polytetrafluoroethylene (referring to as PTFE). When a cation exchange membrane of a fluorinated resin having cation exchange groups such as carboxylic acid groups and sulfonic acid groups, with the conventional PTFE fibriles, the affinity of the resin for the membrane substrate to the PTFE fibriles is not high enough to attain a desired reinforcing effect. In such case, if the content of the PTFE fibriles is increased, the viscoelasticity is highly increased to cause difficulty for fabrication of the membrane and the affinity is not high to cause the ballooning or foaming by the layer peeling-off.

The inventors have found that the troubles caused by the insufficient affinity can be effectively overcome by using hydrophilic PTFE fibriles. The process for producing hydrophilic PTFE which is fibrilatable has been studied to find the fact that the object has been attained by copolymerizing a small amount of a fluorinated monomer having an acid type functional group such as carboxylic acid group in a later stage of an emulsion polymerization of tetrafluoroethylene to form a sheath layer of particles of the polymer.

SUMMARY OF THE INVENTION

It is an object of the present invention to provide a hydrophilic modified polytetrafluoroethylene which is easily fibrilated and which has high affinity to a fluorinated resin used for an ion exchange resin such as a cation exchange membrane, especially in the reinforcement of a cation exchange membrane.

The foregoing and other objects of the present invention have been attained by providing a process for producing a modified polytetrafluoroethylene by polymerizing tetrafluoroethylene in an aqueous medium containing a dispersing agent with a polymerization initiator source and then, copolymerizing tetrafluoroethylene and a fluorinated monomer having an acid type functional group as a copolymerizable modifier in the presence of the resulting polytetrafluoroethylene to obtain a modified polytetrafluoroethylene having the modifier component of 0.001 to 10 mol %.

DETAILED DESCRIPTION OF THE PREFERRED EMBODIMENTS

The process of the present invention is an emulsion polymerization carried out in the presence of a dispersing agent to obtain the polymer as a colloidal dispersion in water. The particle of the polymer has an average diameter of about 0.1 to $0.5\mu$. The polymer can be obtained as particles in a form of powder by coagulation of the dispersion. In usual, it has been found that number of particles formed at the initial stage of the polymerization is not changed in an emulsion polymerization of tetrafluoroethylene whereby the polymerization reaction is performed by increasing diameters of particles.

In the process of the present invention, particles of the modified polytetrafluoroethylene comprise the cores made of homopolymer of tetrafluoroethylene and the modifier component included in the sheath layers which are upto 30% of the total weight of the particles.

The modified polytetrafluoroethylene produced by the process of the present invention has the copolymerized specific modifier component at a ratio of 0.001 to 10 mol % in the sheath layers of the particles of the modified polytetrafluoroethylene as the double layer structure. Even though the content of the modifier component is relatively small, the modifier component is included in the sheath layers whereby hydrophilic property is imparted without substantial changes of various physical properties especially heat-resistance, chemical resistance, and fibrilation from those of the homopolymer. Therefore, this can be effectively used for reinforcing a membrane of a fluorinated resin having cation exchange groups.

The modifier used in the present invention is a fluorinated monomer having an acid type functional group such as carboxylic acid group. The acid type functional groups can be carboxylic acid group, sulfonic acid group and phosphoric acid group or a functional group which is convertible to the acid group. One or two or more kind of the modifier can be used. In the invention, it is important to copolymerize the modifier in the sheath layer of the particles of the polymer. The modifier component-containing sheath layer is formed at a ratio of upto 30% preferably less than 20% based on the total weight of the particles of the polymer. The modifier component is included at a ratio of about 0.001 to 10 mol% preferably about 0.01 to 5 mol% based on the total polymer. When the ratio of the modifier component-containing sheath layer is too high, the fibrilation is insufficient. When the content of the modifier component is too small, the effect of the modification is insufficient whereas when it is too much the fibrilation is insufficient and the heat resistance and the chemical resistance of the product are inferior.

The typical modifiers used in the process of the present invention are fluorovinyl compounds having the formula $$CF_2=CF\text{-}(CFX')_{\overline{p}}(OCF_2CFY)_{\overline{l}}(O)_{\overline{m}}(CFY')_{\overline{n}}A$$

wherein p is 0 or 1; l is 0 to 3; m is 0 to 1; n is 0 to 12; X represents —F, —Cl or —$CF_3$; X' represents —F or —$CF_3$; Y and Y' respectively represent —F or a $C_{1-10}$ perfluoroalkyl group; A represents —CN, —COF, —COOH, —$COOR_1$, —COOM or —$COONR_2R_3$, —$SO_2F$, —$SO_3M$, —$SO_3H$, $$-\overset{O}{\underset{\|}{P}}(OH)_2, \quad -\overset{O}{\underset{\|}{P}}(OR^4)_2, \text{ and } -\overset{O}{\underset{\|}{P}}(OM)_2;$$

R represents a $C_{1-10}$ alkyl group; $R_2$ and $R_3$ respectively represent —H or $R_1$; $R_4$ represents $R_1$; M represents an alkali metal atom or a quaternary ammonium group.

From the viewpoints of the property and availability, it is preferable to use the fluorovinyl compound having the above-mentioned formula wherein X and X' are —F; Y is —$CF_3$; Y' is —F; p is 0 or 1; l is 0 to 1; m is 0 to 1; n is 0 to 8.

From the viewpoint of the copolymerization reaction, it is preferable to use the fluorovinyl compound having the formula wherein A is —$COOR_1$, —$SO_2F$ or $$-\overset{O}{\underset{\|}{P}}(OR^4)_2.$$

Typical fluorovinyl compounds include $CF_2=CFO(CF_2)_{1-8}COOCH_3$, $CF_2=CFO(CF_2)_{1-8}COOC_2H_5$, $CF_2=CF(CF_2)_{0-8}COOCH_3$ $CF_2=CFOCF_2CF(CF_3)OCF_2CF_2CF_2COOCH_3$, $CF_2=CFCF_2O(CF_2)_4COOCH_3$, $CF_2=CFCF_2OCF_2CF_2OCF_2COOCH_3$, $CF_2=CFCF_2OCF(CF_3)COOCH_3$, $CF_2=CFCF_2OCF(CF_3)CF_2OCF(CF_3)COOCH_3$, $CF_2=CFOCF_2CF(CF_3)OCF_2CF_2SO_2F$, $CF_2=CF_2SO_2F$, $CF_2=CFCF_2OCF_2CF_2SO_2F$ and $$CF_2 = CFO(CF_2)_{1-8}\overset{O}{\underset{\|}{P}}(OCH_3)_2.$$

In the process of the present invention, the copolymerizable modifier is fed into the polymerization system to copolymerize it with tetrafluoroethylene after polymerizing tetrafluoroethylene at a ratio of at least 70% of the total weight of tetrafluoroethylene whereby the modifier component can be included in the sheath layers at a ratio of upto 30% of the total weight of the particles of the polymer. Of course, the cores of the modified polytetrafluoroethylene can be formed by the homopolymerization of tetrafluoroethylene and then, the modifier and tetrafluoroethylene can be fed into the reaction system in the presence of the homopolymer particles as cores to carry out the copolymerization.

The typical process of the polymerization reaction of the present invention will be illustrated.

Into a reactor equipped with a temperature controlling mechanism, deionized water is charged and a dispersing agent and a polymerization initiator are added and the temperature is controlled and tetrafluoroethylene is compressed to be a specific pressure with stirring to initiate the polymerization. The temperature for polymerization is preferably in a range of 0° to 100° C. and the pressure for polymerization is in a range of 1 to 100 kg./$cm^2$ preferably 3 to 50 kg./$cm^2$. The pressure in the polymerization reaction system is maintained by the vapor pressure of tetrafluoroethylene. Depending upon the polymerization reaction, tetrafluoroethylene is consumed to reduce the pressure. The inner pressure is maintained by compressing tetrafluoroethylene each time reducing the inner pressure, for example, for 1 kg./$cm^2$ from the initial pressure or by continuously feeding tetrafluoroethylene.

In the process of the present invention, the conventional organic or inorganic peroxides and persulfates which have radical function can be used as the polymerization initiator source. It is also possible to apply ionized radioactive rays such as X-ray and γ-ray as the polymerization initiator source.

The dispersing agent can be various cationic, anionic and nonionic surfactants, especially anionic surfactants as water soluble salts of polyfluoroalkyl compounds, for example, alkali metal salts and ammonium salts of perfluoroalkanic acids and omega-hydroperfluoroalkanic acids. The dispersing agent is usually incorporated at a ratio of 0.01 to 10 wt.% preferably 0.05 to 5 wt.% based on the aqueous medium.

It is possible to incorporate a dispersion stabilizer, a buffering agent, a reaction accelerator, and a pH regulator which are used in the conventional polymerizations in an aqueous medium. It is also possible to incorporate an inert organic solvent such as fluorinated saturated hydrocarbons and chlorofluorinated saturated hydrocarbons known as Fron type solvents.

In the process of the invention, it is preferable to carry out the copolymerization under controlling the concentration of the resulting copolymer to less than 40 wt.% preferably less than 30 wt.%. When the concentration is too high, the disadvantages of high load for stirring, difficulty of heat removal and insufficient diffusion of the monomers are found and the resulting polymer naturally causes coagulation whereby it is difficult to obtain the polymer having uniform property. After the polymerization, the unreacted tetrafluoroethylene monomer is purged. The unreacted acid type modifier monomer can be separated by an extraction with a solvent such as trichlorotrifluoroethane.

The condition of the polymerization after the addition of the modifier is selected depending upon the desired content of the modifier component in the particles of the polymer. The polymerization is usually carried out at a polymerization temperature of 0° to 100° C. under the pressure of 1 to 100 kg./cm² preferably 3 to 50 kg./cm².

The modifier is incorporated at a ratio of 0.001 to 100 wt. parts preferably 0.1 to 30 wt. parts per 100 wt. parts of the aqueous medium. The modifier can be added at once and also can be sequentially or continuously added. The additional materials incorporated in the first stage of the polymerization can be newly added or need not be added to the later stage of the polymerization.

The modified polytetrafluoroethylene of the present invention can be used in various fields, for example, as a reinforcing substance for hydrophilic polymers; a phydrophilic membrane, a filtration membrane, a partition membrane, hydrophilic binder, and a living-acceptable substance.

A further understanding can be obtained by reference to certain specific examples which are provided herein for purposes of illustration only and are not intended to be limiting unless otherwise specified.

In the examples, an ion exchange capacity of a cation exchange membrane was measured as follows.

A H-type cation exchange membrane was immersed into 1N-HCl at 60° C. for 5 hours to completely convert in to H-type membrane, and then, the membrane was washed with water so as to be free of HCl. Then, 0.5 g. of the H-type membrane was immersed into a solution prepared by adding 25 ml of water to 25 ml of 0.1 N—NaOH. Then, the membrane was taken out and the amount of NaOH in the solution was measured by a back titration with 0.1 N—HCl.

EXAMPLE 1

In a 0.2 liter stainless steel autoclave, 100 g. of water, 20 mg. of ammonium persulfate, 0.2 g. of $C_8F_{17}COONH_4$, 0.5 g. of $Na_2HPO_4.12H_2O$, 0.3 g. of $NaH_2PO_4.2H_2O$ and 5 g. of trichlorotrifluoroethane were charged. Air in the autoclave was purged with liquid nitrogen and the autoclave was heated at 57° C. and tetrafluoroethylene was fed under a pressure of 20 kg./cm² to initiate the polymerization. After 0.65 hour, the unreacted tetrafluoroethylene was purged and polytetrafluoroethylene was obtained at a latex concentration of 16 wt.%. Trichlorotrifluoroethane was evaporated from the latex and 20 g. of $CF_2=CFO(CF_2)_3COOCH_3$ was charged into the latex in the autoclave. Air in the autoclave was purged and the autoclave was heated to 57° C. and tetrafluoroethylene was fed under a pressure of 11 kg./cm² to perform the reaction. After 2.6 hours from the initiation of the second reaction, tetrafluoroethylene was purged to finish the reaction. Trichlorotrifluoroethane was added to the resulting latex to separate the unreacted $CF_2=CFO(CF_2)_3COOCH_3$ by the extraction and then, conc. sulfuric acid was added to coagulate the polymer and the polymer was thoroughly washed with water and then, treated with 8 N—NaOH aqueous solution at 90° C. for 5 hours and with 1 N—HCl aqueous solution at 60° C. for 5 hours and then, thoroughly washed with water and dried to obtain 21.1 g. of the polymer. The polymer had an ion exchange capacity of —COOH groups of 0.20 meq./g. polymer to find the fact that the modifier component was included at a ratio of about 2.1 mol %.

The polymer obtained in the first stage and the polymer obtained in the second stage of the polymerization with $CF_2=CFO(CF_2)_3COOCH_3$ were respectively put in water. The former was not wettable to water to float on water surface whereas the later was wettable to water to sink into water.

REFERENCE 1

A copolymer of tetrafluoroethylene with 20 mol % of $CF_2=CFO(CF_2)_3COOCH_3$ obtained by an emulsion polymerization of $CF_2=CF_2$ and $CF_2=CFO(CF_2)_3COOCH_3$ was admixed with 2.7 wt. % of the modified polytetrafluoroethylene obtained in Example 1 or 2.7 wt. % of a homopolymer of polytetrafluoroethylene in trichlorotrifluoroethane with stirring and then, each mixture was dried and kneaded at 190° C. by a two roll mill to result fibriles of the modified or nonmodified polytetrafluoroethylene component and then, it was pressmolded at 230° C. to fabricate a film. The film was hydrolyzed by dipping it in 25% aqueous solution of sodium hydroxide at 90° C. for 16 hours to obtain each ion exchange membrane having a thickness of 300μ. The mechanical properties of the resulting reinforced ion exchange membranes are as follows. The membrane obtained by using the modified polytetrafluoroethylene had a tear strength (propagation) of 8 kg./cm² and maximum flexural times of 2,000 whereas the membrane obtained by using the homopolymer of polytetrafluoroethylene had a tear strength (propagation) of 4 kg./cm² and maximum flexural times of 200. The improvement of the mechanical properties of the membrane obtained by using the modified polytetrafluoroethylene of the present invention was found.

EXAMPLE 2

In accordance with the process of Example 1 except that $CF_2=CFOCF_2CF(CF_3)O(CF_2)_3COOCH_3$ was added instead of $CF_2=CFO(CF_2)COOCH_3$ to copolymerize them in the second stage, the polymerization in the first and second stages was carried out to obtain 24.3 g. of a polymer having an ion exchange capacity of 0.35 meq./g. polymer and a content of the modifier component of 4.0 mol %.

EXAMPLE 3

In accordance with the process of Example 1 except that $CF_2=CFOCF_2CF(CF_3)OCF_2CF_2SO_2F$ was added instead of $CF_2=CFO(CF_2)_3COOCH_3$ to copolymerize them in the second stage, the polymerization in the first and second stages was carried out to obtain 20.5 g. of a polymer having an ion exchange capacity of 0.11 meq./g. polymer and a content of the modified component of 1.1 mol %.

EXAMPLE 4

In accordance with the process of Example 1 except that

was used instead of $CF_2=CFO(CF_2)_3COOCH_3$ and the polymerization time was two hours in the second stage, the polymerization was carried out to obtain 20.3 g. of the polymer having an ion-exchange capacity of 0.16 meq/g. polymer and having a content of the modifier component of 0.82 mol%.

EXAMPLE 5

In accordance with the process of Example 1 except that the polymerization time was 5 hours in the second stage, the polymerization was carried out to obtain 23.8 g. of the polymer having an ion-exchange capacity of 0.40 meq/g. polymer and having a content of the modifier component of 4.4 mol%.

We claim:

1. A process for producing a modified polytetrafluoroethylene which comprises polymerizing tetrafluoroethylene in an aqueous medium containing a dispersing agent with a polymerization initator source and then, copolymerizing tetrafluoroethylene and a fluorinated monomer having an acid functional group or a functional group which is convertible to the acid group as a copolymerizable modifier in the presence of the resulting polytetrafluoroethylene to obtain modified polytetrafluoroethylene particles having cores made of homopolymer of tetrafluoroethylene and sheath layers in which the copolymerized specific modifier is present in the ratio of about 0.001 to 10 mol% based on the total polymer.

2. The process according to claim 1 wherein said modifier component is present in each sheath layer corresponding to upto 30% of the total weight of the particles.

3. The process according to claim 1 or 2 wherein said copolymerizable modifier is fed into the polymerization system to copolymerize with tetrafluoroethylene after polymerizing at least 70% of the total weight of tetrafluoroethylene polymerized.

4. The process according to claim 1, 2 or 3 wherein said copolymerizable modifier is a fluorovinyl compound having the formula

wherein p is 0 or 1; l is 0 to 3; m is 0 to 1; n is 0 to 12; X represents —F, —Cl or —CF$_3$; X' represents —F or —CF$_3$; Y and Y' respectively represent —F or a C$_{1-10}$ perfluoroalkyl group; A represents —CN, —COF, —COOH, —COOR$_1$, —COOM or —COONR$_2$R$_3$, —SO$_2$F, —SO$_3$M, —SO$_3$H,

R$_1$ represents a C$_{1-10}$ alkyl group; R$_2$ and R$_3$ respectively represent —H or R$_1$; R$_4$ represents R$_1$; M represents an alkali metal atom or a quaternary ammonium group.

* * * * *